(12) United States Patent
Polak et al.

(10) Patent No.: US 7,953,438 B2
(45) Date of Patent: May 31, 2011

(54) COMMON CIRCUITS AND USER INTERFACES FOR SHUTTERS AND ELECTRO-OPTICAL COMPONENTS

(75) Inventors: Robert D. Polak, Lindenhurst, IL (US); Ken K. Foo, Gurnee, IL (US); John W. Kaehler, Lake Bluff, IL (US); Zhiming Zhuang, Kildeer, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 962 days.

(21) Appl. No.: 11/566,759

(22) Filed: Dec. 5, 2006

(65) Prior Publication Data

US 2008/0132277 A1      Jun. 5, 2008

(51) Int. Cl.
*H04B 1/38* (2006.01)
(52) U.S. Cl. ............... 455/557; 455/550.1; 455/575.1
(58) Field of Classification Search .......... 455/557, 455/575.1, 403, 550.1, 556.2, 414.1; 345/109
See application file for complete search history.

(56) References Cited

U.S. PATENT DOCUMENTS

| | | | | |
|---|---|---|---|---|
| 4,079,201 A * | 3/1978 | Scott et al. | | 379/131 |
| 7,075,643 B2 * | 7/2006 | Holub | | 356/326 |
| 7,542,781 B2 * | 6/2009 | Murata | | 455/556.1 |
| 2005/0243237 A1 | 11/2005 | Sasuga | | |
| 2006/0003373 A1 * | 1/2006 | Ammann et al. | | 435/6 |
| 2006/0077279 A1 | 4/2006 | Kang | | |
| 2006/0209012 A1 * | 9/2006 | Hagood | | 345/109 |
| 2009/0052878 A1 * | 2/2009 | Warpakowski Furlan | | 396/6 |
| 2009/0223942 A1 * | 9/2009 | Heyl | | 219/121.69 |
| 2010/0075336 A1 * | 3/2010 | Knight et al. | | 435/6 |

FOREIGN PATENT DOCUMENTS

JP        2003150070 A        5/2003

* cited by examiner

*Primary Examiner* — Dominic E Rego
(74) *Attorney, Agent, or Firm* — Hisashi D. Watanabe

(57) ABSTRACT

Disclosed are circuits and user interfaces of a mobile communication device that include a light source and a shutter that are driven by at least one common voltage line. Also disclosed are circuits and user interfaces of a mobile communication device that include a sensor and a shutter that are driven by at least one common voltage line. Further disclosed are circuits and user interfaces that include a light source, a sensor and a shutter that are driven by at least one common voltage line. The shutter may be divided into a plurality of segments so that one segment may be in optical alignment with a light source and another segment may be in optical alignment with a sensor. A shutter may be part of the same circuit as a light source and/or a sensor without needing its own circuit and driver.

12 Claims, 4 Drawing Sheets

COMMON CIRCUITS AND USER INTERFACES FOR SHUTTERS AND ELECTRO-OPTICAL COMPONENTS

FIELD

Disclosed are circuits and user interfaces of mobile communication devices, and more particularly circuits and user interfaces of mobile communication devices that include a light source, a sensor and a shutter that are driven by at least one common voltage line.

BACKGROUND

The makers of mobile communication devices, including those of cellular telephones, are increasingly adding features and functionality to their devices. For example, cellular telephones may include features such as still and video cameras, video streaming, two-way video calling, MP3 audio playback and RFID readers to name a few. While there is a trend toward the inclusion of more features and improvements for current features, there is also a trend toward smaller mobile communication devices. Fewer hardware components are therefore desirable when adding new features and making improvements to the current features in the smaller devices. Fewer hardware components may provide a cost benefit to the consumer.

Manufacturers of mobile communication devices often seek aesthetic features that may distinguish their products from others' products. For example, a user interface may include features known as trademark features of a particular mobile communication device manufacturer. Adding features to a user interface may make requirements on the overall system configuration including adding circuits, power draws and components. In adding components to a "deadfront" look user interface, a shutter may be necessary to hide a component or components when they are not in use. In keeping with the deadfront look, the shutter as well as the component both may be power draws and require circuit components.

DETAILED DESCRIPTION

Disclosed are circuits and user interfaces of a mobile communication device that include a light source and a shutter that are driven by at least one common voltage line. Also disclosed are circuits and user interfaces of a mobile communication device that include a sensor and a shutter that are driven by at least one common voltage line. Further disclosed are circuits and user interfaces that include a light source, a sensor and a shutter that are driven by at least one common voltage line.

In one embodiment, the light source may be a Bluetooth indicator LED and the sensor may be an ambient light sensor. The shutter may include a layer of electrically controlled material configured to change from substantially transparent to substantially opaque by changing the state of the controlled material. The shutter may be divided into a plurality of segments so that one segment may be in optical alignment with a light source and another segment may be in optical alignment with a sensor.

Accordingly, in adding features to a user interface, and in particular adding components to a "deadfront" look user interface, a shutter may be used to hide a component or components when they are not in use. For the deadfront look, a shutter may be part of the same circuit as a light source and/or a sensor so that it may not need its own circuit and driver and possibly may not be a substantial power draw to the device.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims. It is understood that the use of relational terms, if any, such as first and second, up and down, and the like are used solely to distinguish one from another entity or action without necessarily requiring or implying any actual such relationship or order between such entities or actions.

Figure 1:
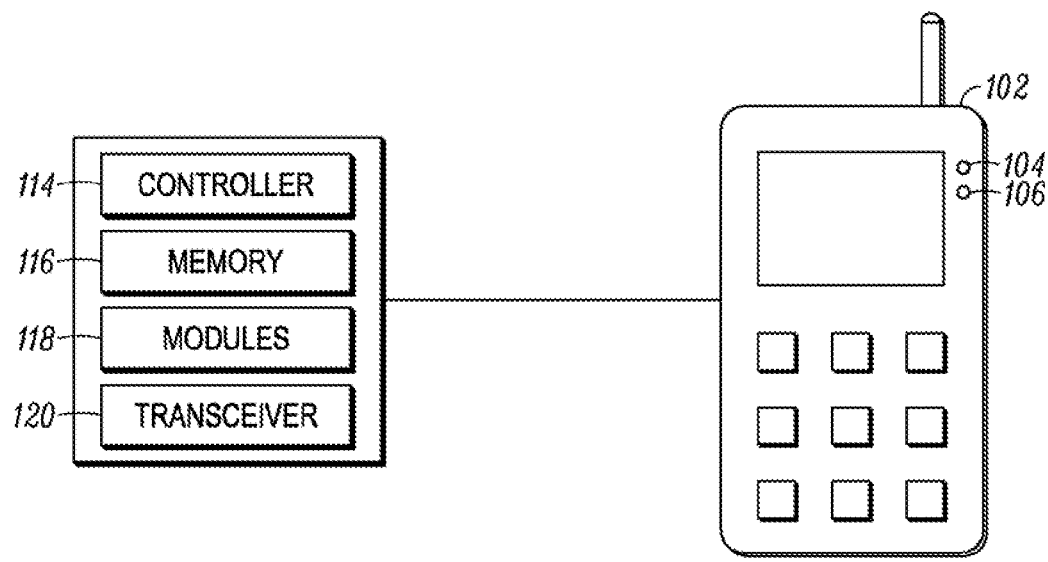
FIG. 1 depicts an electronic device such as a mobile communication device having a light source and a sensor.

FIG. 1 depicts an electronic device such as a mobile communication device 102 having at least one of a light source 104 and a sensor 106. The user interface including at least the light source 104 and/or the sensor 106 can have a deadfront look, where one or both of the light source and the sensor can be behind a shutter or shutter segment 208 (see FIG. 2) when they are not in use. The light source 104 and the sensor 106 may be in any position on the mobile communication device 102. They may be proximal one another or they may be distal one another. The electronic device 102, and more particularly a mobile communication device 102, may be implemented as a cellular telephone (also called a mobile phone).

The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP). It is understood that the electronic device 102 described herein can be any type of electronic device, and that a mobile communication device is discussed by way of an example of an electronic device.

It is understood that the light source 104 may be for any purpose, such as an indicator light. In one embodiment the light source 104 may be used to indicate that a device is operating in a particular mode, for example, Bluetooth mode. The light source 104, or light emitting element (LEE) can be for example a light emitting diode (LED), an organic light emitting diode (OLED), an electroluminescent (EL) device, and/or a cold cathode fluorescent lamp (CCFL).

It is further understood that the sensor 106 may be for any purpose, such as an ambient light sensor that may be useful in making adjustments to the light output of a display and hence in conserving power. The sensor 106 can be for example a photodiode, or a phototransistor, for example, filtered to measure only visible light, or filtered to measure only IR or UV light.

The electronic device 102 can include a controller 114, a memory 116 and modules 118. If the electronic device is a mobile communication device 102, it can include a transceiver 120. The modules 118 can provide instructions to the controller 114 to carry out certain processes of the methods as described herein. The modules 118 can be implemented in software, such as in the form of one or more sets of prestored instructions, and/or hardware, which can facilitate the operation of the mobile station or electronic device as discussed below. The modules 118 may be installed at the factory or can be installed after distribution by, for example, a downloading operation.

Figure 2:
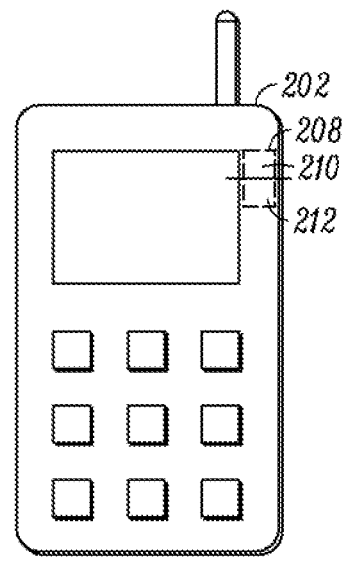
FIG. 2 depicts a mobile communication device while a shutter is substantially opaque so that the light source and/or the sensor of FIG. 1 can be substantially hidden from view.

FIG. 2 depicts a mobile communication device 202 while the shutter 208 is substantially opaque so that at least one of the light source 104 (see FIG. 1) and/or the sensor 106 can be substantially hidden from view. The shutter 208 can be divided into at least two segments 210 and 212. The shutter may be an optical shutter, for example an electrically or thermally controlled material that changes its opacity when at a particular voltage, from substantially transparent to substantially opaque. The light source 104 can be in optical alignment with shutter segment 210 and the sensor 106 can be in optical alignment with the shutter segment 212. That is, the light source 104 is behind the shutter 208 with respect to the user as is the sensor 106 behind the shutter 208 with respect to the user.

The state of the electrically or thermally controlled material, that is, its opacity or its transparency, can be controlled by an amplitude of a voltage. The controlled material can be selected from the group consisting of electrically switchable mirror material, polymer liquid crystal material, cholesteric liquid crystal material, twisted nematic (TN) liquid crystal material, and supertwist nematic (STN) liquid crystal material. It is understood that any suitable material may be used as a controlled material. The controlled material can be opaque, for example, by reflection and/or by absorption.

It is understood that in this description, transparent and opaque refer to substantially transparent and substantially opaque, respectively. Other references to substantial characteristics are likewise considered. For example, the light source 104 and/or the sensor 106 may be active or may be non-active, as discussed below. In this description, non-active refers to substantially inactive as well as to inactive.

Figure 3:
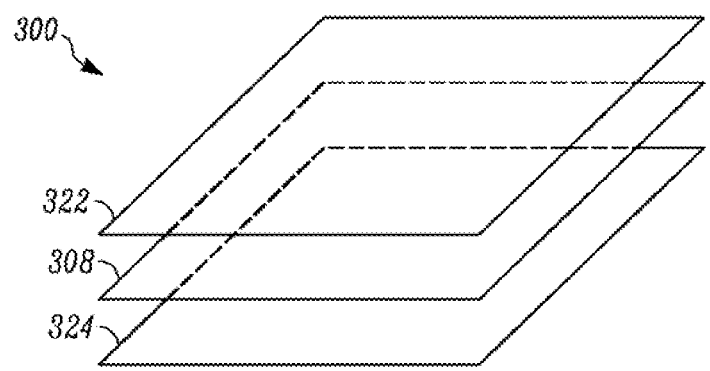
FIG. 3 depicts three layers of an electrically controlled material including an electrode layer, an STN layer for example, and a backplane.

FIG. 3 depicts three layers of an electrically controlled material 300, including an electrode layer 322, an STN layer 308 for example, and a backplane 324. In a device with a user interface and having a controller 114 (see FIG. 1), a light source 104 may coupled to the controller 114, a sensor 106 may be coupled to the controller 114 and a shutter 208 (see FIG. 2) may be coupled to the controller 114. The light source 104, the sensor 106, and the shutter 208 can be driven by at least one common voltage line, for example, the voltage line to the backplane 324. It is understood that the common voltage line may be, for example, the voltage line to the segment 210 and/or 212 or any other common voltage line. In this manner, the shutter can be driven by the same circuit as either the light source 104 and/or the sensor 106. Accordingly, for the deadfront look, a shutter 208 may be part of the same circuit as a light source 104 and/or a sensor 106 so that it may not need its own circuit and driver and possibly may not be a substantial power draw to the device.

An electrically or thermally controlled shutter, or optical shutter, may be transparent when a voltage is applied to it and opaque when no voltage is applied to it or is below a predetermined threshold. For example, the voltage may be in the range 1 to 50 Volts. In one embodiment, the voltage may be 5 Volts. While a light source 104 such as an LED may emit light under forward bias, and the shutter may require AC voltage, the LED may still appear in an ON state as it will be ON 50% of the time. A typical duty cycle is 50%, meaning that the light source 104 is ON and OFF at equal intervals. As with a sequence of motion picture frames that is displayed at a sufficiently high temporal frequency so that a human observer integrates the sequence of frames to perceive the effect of images in smooth motion, the light source turning OFF and ON at a fast rate may be perceived by an observer as continuously ON. Likewise, while a sensor 106 may detect light under a forward bias and the shutter 208 may require AC voltage, the controller 114 receiving the signal of the sensor 106 can compensate and/or detect only when the forward bias is present. In other cases where there is no forward bias, the light source 104 and/or the sensor 106 may operate under an AC voltage. It is understood that an AC voltage can include voltages that have a DC component as well as an AC component, so that the AC voltage can very in time without substantially changing polarity.

The shutter 208 and the light source 104 and the sensor 106 may operate according to approximately the same voltage magnitude. Accordingly, the below-described circuit may drive a light source 104 such as an LED and a sensor 106 such as an ambient light sensor, as well as a shutter 208, when either is in use.

Figure 4:
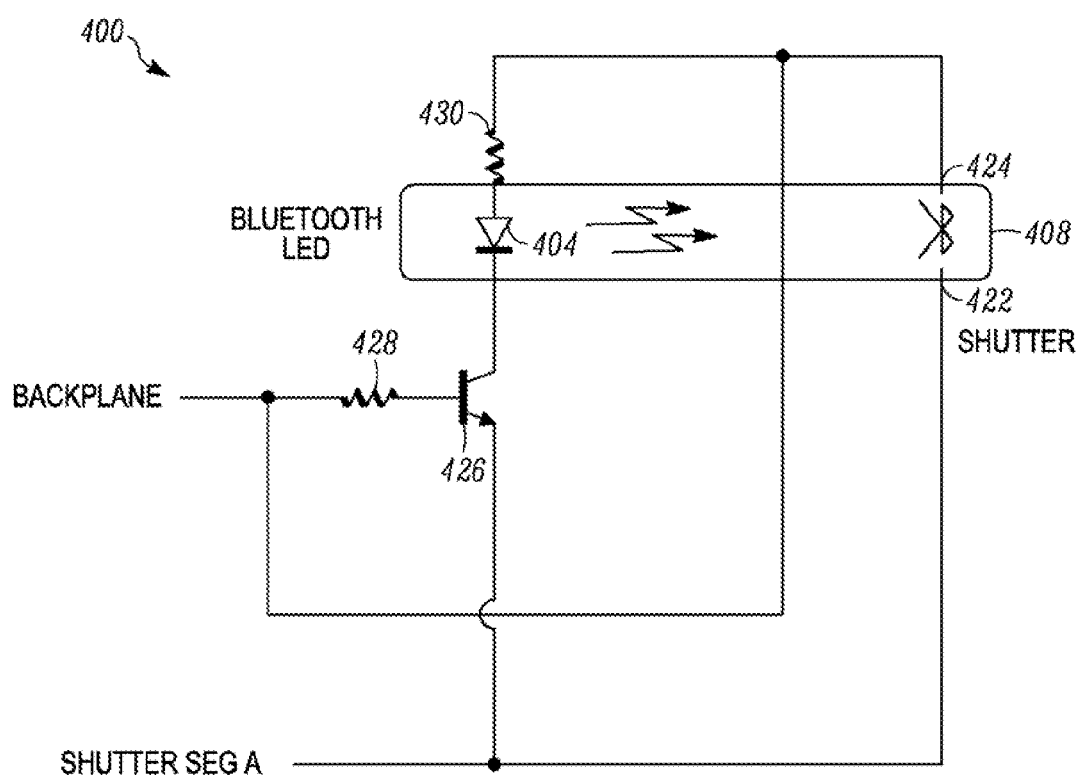
FIG. 4 shows an embodiment of a circuit including an optical shutter segment and a light emitting element.

FIG. 4 shows an embodiment of a circuit 400 including an optical shutter segment 408 and a light emitting element 404. The optical shutter segment can include an electrode layer 422 and a backplane 424. The backplane may be common to more than one shutter segment. Application of a voltage to the electrode layer 422 may also be referred to as application of a voltage to the shutter segment 408.

The light emitting element may be, for example, an LED configured to indicate Bluetooth activity. The light emitting element can be coupled to the electrode layer 422, that is, the segment 408, and the backplane, 424. The circuit further may include a transistor 426, a base resistor 428, and a collector resistor 430. The base resistor 428 can limit current flow across the base-emitter junction of transistor 426, while collector resistor 430 can limit current flow through the LED 404.

The LED 404 emits light when sufficiently forward biased and can be dark when reverse biased. Thus, the light source 404 may be configured to be active when the voltage applied to the backplane 422 is of a particular polarity and of a magnitude greater than a predetermined value with respect to the voltage applied to the shutter segment 408, and may be configured to be non-active otherwise.

The shutter segment 408 may operate with an AC voltage, particularly an AC voltage of a magnitude comparable to the operating voltage of the LED 404. Therefore, the shutter segment 408 can be configured to be transparent when a voltage applied to the backplane 424 is of a magnitude greater than a predetermined value with respect to a voltage applied to the shutter segment 408. The shutter can be likewise configured to be opaque when the voltage applied to the backplane 424 has a magnitude substantially less than the predetermined value with respect to the voltage applied to the shutter segment 408.

Figure 5:
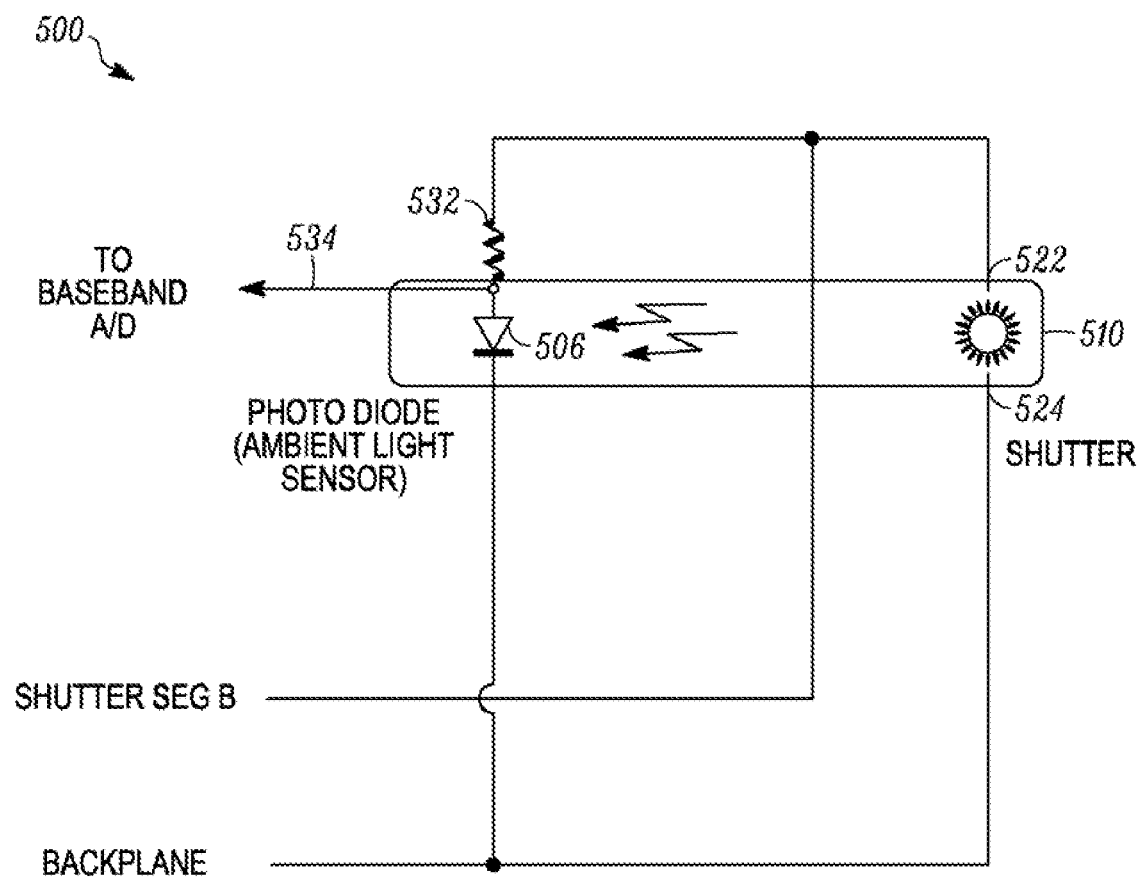
FIG. 5 shows an embodiment of a circuit including an optical shutter segment and a sensor.

FIG. 5 shows an embodiment of circuit 500 including an optical shutter segment 510 and a sensor 506. The optical shutter segment can include an electrode layer 522 and a backplane 524. As described above in connection with FIG. 4, the backplane may be common to more than one shutter segment. Application of a voltage to the electrode layer 522 may also be referred to as application of a voltage to the shutter segment 510.

The sensor 506 may be, for example, a photo diode configured to sense an ambient light level. It is understood that other sensors may be used, for example, a phototransistor, with appropriate circuitry. The sensor can be coupled to the electrode layer 522, that is, the segment 510, and the backplane 524. The circuit may further include a resistor 532 to provide a voltage drop with respect to the shutter 510, since essentially all the current that flows through the photo diode 506 also flows through the resistor 532. Voltage data, and therefore a measurement of detected light, can be provided via a connection 534 to an analog-to-digital (A/D) converter.

The photo diode 506 can sense a light level when sufficiently forward biased and can be non-active when reverse biased. Thus, the sensor 506 may be configured to be active when the voltage applied to the backplane 522 is of a particular polarity and of a magnitude greater than a predetermined value with respect to the voltage applied to the shutter segment 510, and may be configured to be non-active otherwise.

As discussed above in connection with FIG. 4, the shutter segment 510 may operate with an AC voltage, particularly an AC voltage of a magnitude comparable to the operating voltage of the photo diode 506. Therefore, the shutter segment 510 can be configured to be transparent when a voltage applied to the backplane 524 is of a magnitude greater than a predetermined value with respect to a voltage applied to the shutter segment 510. The shutter can be likewise configured to be opaque when the voltage applied to the backplane 524 has a magnitude substantially less than the predetermined value with respect to the voltage applied to the shutter segment 510.

Figure 6:
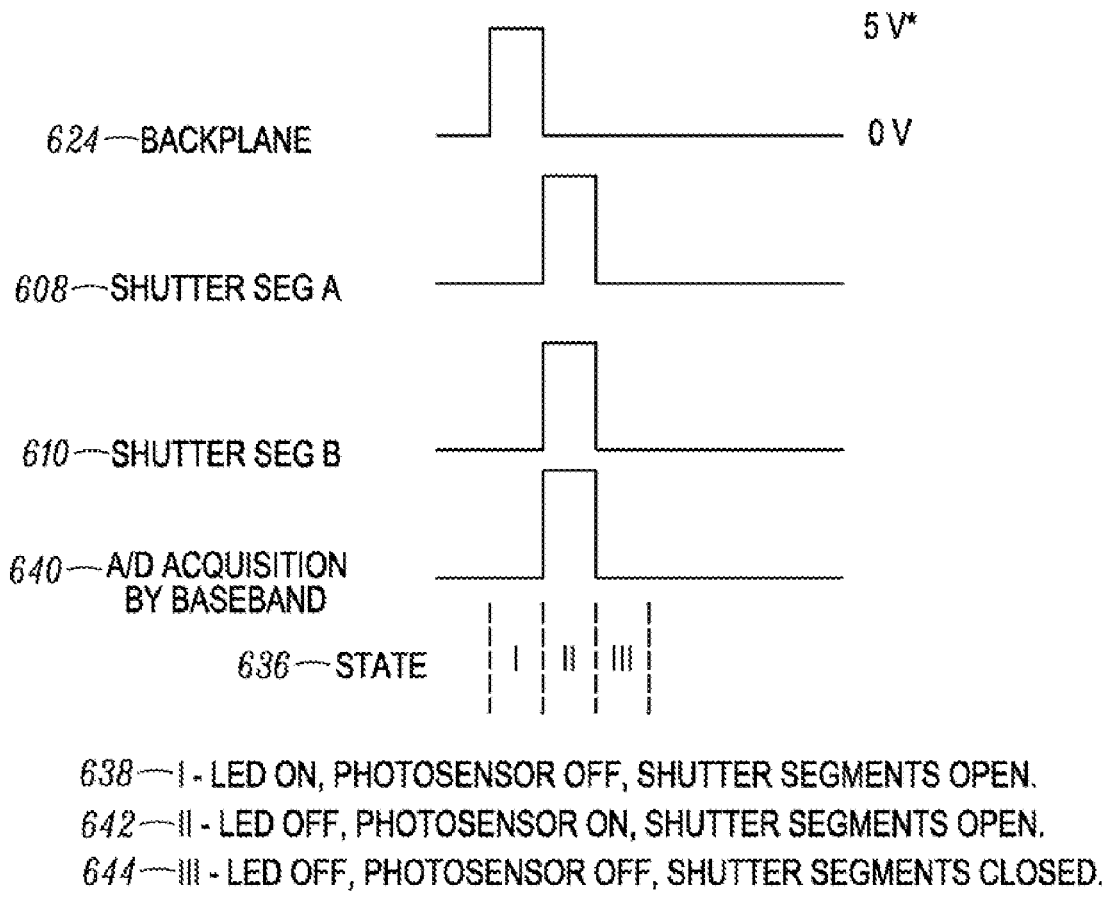
FIG. 6 illustrates voltages that may be utilized with the circuits depicted in FIGS. 4 and 5.

FIG. 6 illustrates voltages that may be utilized with the described circuits depicted in FIGS. 4 and 5. A state of the shutter may be discussed with reference to respective voltages that may be applied to the backplane 324 (see FIG. 3) and one or another shutter segment 422 (see FIG. 4) and 522 (see FIG. 5). As shown, there may be three states 636. It is understood that additional LEEs, sensors, or other elements may be configured with additional shutter segments and operating voltages, without departing from the scope of this disclosure. The horizontal axes of the voltage plots of FIG. 6 are not intended to represent passage of time, but to facilitate representation of different possible states of the shutter.

In a first state 638, a non-zero voltage can be applied to the backplane 624, while shutter segment 608 and shutter segment 610 can be held at a voltage of zero. As discussed above, the voltage applied to the backplane may be typically an AC voltage, and may have a magnitude in the range 1 to 50 volts, with a typical magnitude of 5 volts. Under the voltages applied in the first state, the shutter segments are open, and the LED will be ON with a duty cycle of approximately 50%. An A/D converter may be enabled by application of a voltage 640. In the first state 638, the voltage 640 may be held at a voltage of zero, so that the A/D converter may be disabled, and thus the photosensor can be off.

In a second state 642, the backplane 624 can be held at a voltage of zero, or any voltage substantially less than in the first state 638, while a positive DC voltage can be applied to shutter segment 608, shutter segment 610, and to the A/D converter 640. These voltages may be for example in the range 1 to 50 volts, with a typical magnitude of 5 volts. Under the voltages applied in the second state, the LED can be non-active, the photodiode can be active, and the A/D converter may be enabled. The shutter segments may be open due to the voltages applied between the shutter segments and the backplane.

In a third state 644, the backplane 624, shutter segment 608, shutter segment 610, and the A/D converter enable voltage 640 may be all held at a voltage of zero, or other lower voltage as mentioned above. Under the voltages applied in the third state, the LED and photodiode can be non-active, and the A/D converter may be enabled. The shutter segments may be closed since a voltage of zero is applied between the shutter segments and the backplane.

In the event that instead of a light source 104 (see FIG. 1) and a sensor 106, two light sources or two sensors are combined in a circuit with a shutter 208 (see FIG. 2), the above-described circuit may also be considered. Other components that can operate with the same or similar voltage requirement and particular polarities may be used in place of a light source 104 and/or a sensor 106.

In adding features to a user interface, and in particular adding components to a "deadfront" look user interface, a shutter may be used to hide a component or components when they are not in use. For the deadfront look, a shutter may be part of the same circuit as a light source and/or a sensor so that it may not need its own circuit and driver and possibly may not be a substantial power draw to the device.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A circuit, comprising:
an optical shutter having a segment and a backplane; and
a light source coupled to the segment and the backplane, wherein:
the segment is configured to be transparent when a voltage applied to the backplane is of a magnitude greater than a predetermined value with respect to a voltage applied to the segment, and configured to be opaque when the voltage applied to the backplane has a magnitude less than the predetermined value with respect to the voltage applied to the segment; and
the light source is configured to be active when the voltage applied to the backplane is of a particular polarity and of a magnitude greater than the predetermined value with respect to the voltage applied to the segment, and configured to be non-active otherwise.

2. The circuit of claim 1, wherein the optical shutter comprises a liquid crystal shutter.

3. The circuit of claim 1, wherein the light source is a light emitting diode.

4. The circuit of claim 1, wherein the optical shutter is optically aligned with the light source.

5. The circuit of claim 1, wherein the segment comprises a first segment, the predetermined value comprises a first predetermined value, and the optical shutter further has a second segment, the circuit further comprising:

a sensor coupled to the second segment and the backplane;
wherein:
the second segment is configured to be transparent when the voltage applied to the backplane is of a magnitude greater than a second predetermined value with respect to a voltage applied to the second segment, and configured to be opaque when the voltage applied to the backplane has a magnitude less than the second predetermined value with respect to the voltage applied to the second segment; and
the sensor is configured to be active when the voltage applied to the backplane is of an opposite polarity to the particular polarity and of a magnitude greater than the second predetermined value with respect to the voltage applied to the second segment, and configured to be non-active otherwise.

6. The circuit of claim 5, wherein the first predetermined value and the second predetermined value are equal.

7. A circuit, comprising:
an optical shutter having a segment and a backplane; and
a sensor coupled to the segment and the backplane,
wherein:
the segment is configured to be transparent when a voltage applied to the backplane is of a magnitude greater than a predetermined value with respect to a voltage applied to the segment, and configured to be opaque when the voltage applied to the backplane has a magnitude less than the predetermined value with respect to the voltage applied to the segment; and
the sensor is configured to be active when the voltage applied to the backplane is of a particular polarity and of a magnitude greater than the predetermined value with respect to the voltage applied to the segment, and configured to be non-active otherwise.

8. The circuit of claim 7, wherein the optical shutter comprises a liquid crystal shutter.

9. The circuit of claim 7, wherein the sensor is a photosensor.

10. The circuit of claim 7, wherein the optical shutter is optically aligned with the sensor.

11. The circuit of claim 7, wherein the segment comprises a first segment, the predetermined value comprises a first predetermined value, and the optical shutter further has a second segment, the circuit further comprising:

a light source coupled to the second segment and the backplane;
wherein:
the second segment is configured to be transparent when the voltage applied to the backplane is of a magnitude greater than a second predetermined value with respect to a voltage applied to the second segment, and configured to be opaque when the voltage applied to the backplane has a magnitude less than the second predetermined value with respect to the voltage applied to the second segment; and
the light source is configured to be active when the voltage applied to the backplane is of an opposite polarity to the particular polarity and of a magnitude greater than the second predetermined value with respect to the voltage applied to the second segment, and configured to be non-active otherwise.

12. The circuit of claim 11, wherein the first predetermined value and the second predetermined value are equal.

* * * * *